(12) United States Patent
Murray et al.

(10) Patent No.: US 12,461,108 B2
(45) Date of Patent: *Nov. 4, 2025

(54) MASS SPECTROMETRY KIT INCLUDING A CROSS-LINKED ANTIBODY OR FRAGMENT THEREOF

(71) Applicants: THE BINDING SITE GROUP LIMITED, Birmingham (GB); MAYO FOUNDATION FOR MEDICAL EDUCATION AND RESEARCH, Rochester, MN (US)

(72) Inventors: David L. Murray, Rochester, MN (US); Stephen Harding, Birmingham (GB); David R. Barnidge, Rochester, MN (US); Gregg Wallis, Birmingham (GB); John Mills, Rochester, MN (US); Jamie Ashby, Birmingham West Midlands (GB)

(73) Assignees: THE BINDING SITE GROUP LIMITED, Birmingham (GB); MAYO FOUNDATION FOR MEDICAL EDUCATION AND RESEARCH, Rochester, MN (US)

( * ) Notice: Subject to any disclaimer, the term of this patent is extended or adjusted under 35 U.S.C. 154(b) by 914 days.

This patent is subject to a terminal disclaimer.

(21) Appl. No.: 16/078,986

(22) PCT Filed: Feb. 24, 2017

(86) PCT No.: PCT/GB2017/050489
§ 371 (c)(1),
(2) Date: Aug. 22, 2018

(87) PCT Pub. No.: WO2017/144900
PCT Pub. Date: Aug. 31, 2017

(65) Prior Publication Data
US 2019/0094239 A1 Mar. 28, 2019

Related U.S. Application Data

(60) Provisional application No. 62/368,606, filed on Jul. 29, 2016.

(30) Foreign Application Priority Data

Feb. 25, 2016 (GB) ..................................... 1603291

(51) Int. Cl.
*G01N 33/68* (2006.01)
*C07K 16/00* (2006.01)
*C07K 16/42* (2006.01)

(52) U.S. Cl.
CPC ......... *G01N 33/6854* (2013.01); *C07K 16/00* (2013.01); *C07K 16/42* (2013.01); *G01N 33/6893* (2013.01); *C07K 2317/54* (2013.01); *G01N 2560/00* (2013.01); *G01N 2800/24* (2013.01)

(58) Field of Classification Search
CPC ........................... G01N 33/96; C07K 16/4283
See application file for complete search history.

(56) References Cited

U.S. PATENT DOCUMENTS

| 2003/0003465 A1* | 1/2003 | Little | G01N 33/6848 |
| | | | 435/7.1 |
| 2005/0142609 A1* | 6/2005 | Seed | C07K 16/00 |
| | | | 435/327 |
| 2008/0206787 A1* | 8/2008 | Wu | G01N 33/6851 |
| | | | 435/7.4 |

FOREIGN PATENT DOCUMENTS

| EP | 1870710 A1 | 12/2007 |
| WO | 91/03493 A1 | 3/1991 |
| WO | WO-199106570 A1 * | 5/1991 |
| WO | 97/17372 A1 | 5/1997 |
| WO | 00/44788 A1 | 8/2000 |

(Continued)

OTHER PUBLICATIONS

Thermo Scientific Bismaleimide Crosslinkers (BMOE, BMB, and BMH) (Year: 2012).*
Zhang, Q., et al. "Cysteine Racemization on IgG Heavy and Light Chains," The Journal of Biological Chemistry, 288 (48), 2013, pp. 34325-34335.
Zhang, Q., et al. "IgG1 Thioether Bond Formation in Vivo," The Journal of Biological Chemistry, 288(23), 2013, pp. 16371-16382.
Beck, A., et al. "Characterization of Therapeutic Antibodies and Related Products," Anal. Chem. 85, 2013, pp. 715-736.

(Continued)

*Primary Examiner* — Karen A. Canella
(74) *Attorney, Agent, or Firm* — Stites & Harbison, PLLC; Mandy Wilson Decker; Patrick M. Torre

(57) ABSTRACT

An anti-immunoglobulin specific antibody (or fragment thereof), characterised that the antibody or fragment thereof comprises one or more non-disulphide cross-links between at least one heavy chain or fragment thereof and at least one light chain or fragment thereof of the antibody or fragment thereof. A method purifying an anti-immunoglobulin specific antibody (or fragment thereof), characterised that the antibody or fragment thereof comprises one or more non-disulphide cross-links between at least one heavy chain or fragment thereof and at least one light chain or fragment thereof of the antibody or fragment thereof. A method of quantifying an amount of a subject analyte, or a fragment of an analyte in a sample from the subject comprising: (i) adding to the sample a predetermined amount of one or more control analytes or fragments thereof, which are distinguishable from the equivalent subject analyte or fragment; (ii) measuring the relative amount of the subject analyte or fragment and the amount of the control analyte or fragment in the sample; and (iii) comparing the relative amount of subject analyte or fragment to the relative amount of control analyte or fragment, to quantify the amount of analyte or fragment in the original subject sample.

19 Claims, 14 Drawing Sheets

(56) References Cited

FOREIGN PATENT DOCUMENTS

| WO | 2006/099481 A2 | 9/2006 | | |
|---|---|---|---|---|
| WO | 2008/079914 A1 | 7/2008 | | |
| WO | 2011/042027 A2 | 4/2011 | | |
| WO | 2011/095818 A1 | 8/2011 | | |
| WO | 2011/107965 A1 | 9/2011 | | |
| WO | 2013/050731 A1 | 4/2013 | | |
| WO | 2013/088126 A1 | 6/2013 | | |
| WO | 2013/132268 A1 | 9/2013 | | |
| WO | 2014/121031 A1 | 8/2014 | | |
| WO | 2015/131169 A2 | 9/2015 | | |
| WO | 2015/154052 A1 | 10/2015 | | |
| WO | WO-2016018978 A1 | * | 2/2016 | ......... A61K 39/3955 |
| WO | WO-2016063299 A2 | * | 4/2016 | ........... A61K 38/482 |
| WO | 2017/053932 A1 | 3/2017 | | |

OTHER PUBLICATIONS

Lupinek, C., et al. "Trimolecular Complex Formation of IgE, FcεRI, and a Recombinant Nonanaphylactic Single-Chain Antibody Fragment with High Affinity for IgE," The Journal of Immunology, 2009, pp. 4817-4829.

Steinhoff, R.F., et al. "Microarray-based MALDI-TOP mass spectrometry enables monitoring of monoclonal antibody production in batch and perfusion cell structures," Methods 104, 2016, pp. 33-40.

Goldberg, M., et al. "Specific Interchain Cross-Linking of Antibodies Using Bismaleimides. Repression of Ligand Leakage in Immunoaffinity Chromatography," Bioconjugate Chem. 2, 1991, pp. 275-280.

Auclair, J.R., "Strategies for stabilizing superoxide dismutase (SOD1), the protein destabilized in the most common form of familial amyotrophic lateral sclerosis," PNAS, 107(50), 2010, pp. 21394-21399.

Frenzel, A., et al. "Expression of recombinant antibodies," Frontiers in Immunology, 4(217), 2013, pp. 1-20.

Geula, S., et al. "Structure-based Analysis of VDAC1 Protein," The Journal of Biological Chemistry, 287(3), 2012, pp. 2179-2190.

Jo, H., et al. "Development of a-Helical Calpain Probes by Mimicking a Natural Protein-Protein Interaction," J Am Chem Soc, 134(42), 2012, pp. 17704-17713.

Kida, Y., et al. "Two translocating hydrophilic segments of a nascent chain span the ER membrane during multispanning protein topogenesis," The Journal of Cell Biology, 179(7), 2007, pp. 1441-1452.

Stech, M., et al. "Cell-Free Synthesis Meets Antibody Production: A Review," Antibodies, 4, 2015, pp. 12-33.s.

Bernardes, G.J.L., et al. "From Disulfide- to Thioether-Linked Glycoproteins," Angew Chem Int Ed 2008 47, 2244-247.

Katoh, S. "Separation with Affinity Chromatography," Japanese Society for Artificial Organs, Journal of Artificial Organs, 1987, vol. 16, No. 5, pp. 1675-1681.

Beck, A., et al. Characterization of Therapeutic Antibodies and Related Products. Anal. Chem. 2013, 85, 715-736.

Korean Intellectual Property Office, Office Action (Official Notice of Preliminary Rejection) issued in corresponding Application No. 10-2018-7027703, issued Mar. 18, 2024.

Edfors, F., et al. Immunoproteomics Using Polyclonal Antibodies and Stable Isotope-labeled Affinity-purified Recombinant Proteins. 2014. The American Society for Biochemistry and Molecular Biology, Inc. pp. 1611-1624.

European Patent Office, Examination Report issued in corresponding Application No. 22 190 012.9 dated Aug. 26, 2025.

Tous, G.I., et al. "Characterization of a Novel Modification to Monoclonal Antibodies: Thioether Cross-link of Heavy and Light Chains," Analytical Chemistry, vol. 77, No. 9, May 1, 2005, pp. 2675-2682, XP055551114, DOI: 10.1021/ ac0500582.

* cited by examiner

|  | Untreated | BMOE cross-linked |
|---|---|---|
| Top OD | 3.11 | 2.89 |
| Bottom OD | 0.10 | 0.09 |
| IgG % cross-reactivity | 0.057 | 0.058 |
| IgA % cross-reactivity | 0.083 | 0.086 |
| IgM % cross-reactivity | 0.31 | 0.32 |

|  | Untreated | BMOE cross-linked |
|---|---|---|
| Top OD | 3.02 | 1.06 |
| Bottom OD | 0.20 | 0.11 |
| IgG % cross-reactivity | 0.16 | 0.11 |
| IgA % cross-reactivity | 0.21 | 0.14 |
| IgM % cross-reactivity | 0.69 | 0.32 |

B

| | Coefficient of Variation (%; n=96 per plate) | | |
|---|---|---|---|
| | GK +1 Peak Area | rKappa +1 Peak Area | Peak Area Ratio (GK/rKappa) |
| Plate #1 | 35 | 33 | 4.3 |
| Plate #2 | 41 | 39 | 7.2 |
| Plate #1 + Plate #2 | 38 | 36 | 6.4 |

MASS SPECTROMETRY KIT INCLUDING A CROSS-LINKED ANTIBODY OR FRAGMENT THEREOF

The invention relates to anti-immunoglobulin specific antibodies (or fragments thereof) which comprise one or more non-disulphide cross-links between at least one heavy chain and at least one light chain of the antibodies. These are particularly useful in the isolation or purification of immunoglobulins from samples. Control immunoglobulins are also provided for incorporation into samples to be used as standards in mass spectrometry.

Antibody molecules (also known as immunoglobulins) have a twofold symmetry and typically are composed of two identical heavy chains and two identical light chains, each containing variable and constant domains. The variable domains of the heavy and light chains combine to form an antigen-binding site, so that both chains contribute to the antigen-binding specificity of the antibody molecule. The basic tetrameric structure of antibodies comprises two heavy chains covalently linked by a disulphide bond. Each heavy chain is in turn attached to a light chain, again via a disulphide bond. This produces a substantially "Y"-shaped molecule.

Heavy chains are the larger of the two types of chain found in antibodies, with typical molecular mass of 50,000-77,000 Da, compared with the smaller light chain (25,000 Da).

There are five main classes or class or classes of heavy chain which are γ, α, μ, δ and ε which are the constituents heavy chains for: IgG, IgA, IgM, IgD and IgE respectively. IgG is the major immunoglobulin of normal human serum, accounting for 70-75% of the total immunoglobulin pool. This is the major antibody of secondary immune responses. It forms a single tetramer of two heavy chains plus two light chains.

IgM accounts for approximately 10% of the immunoglobulin pool. The molecules, together with J-chains, form a pentamer of five of the basic 4-chain structures. The individual heavy chains have a molecular weight of approximately 65,000 Da and the whole molecule has a molecular weight of about 970,000 Da. IgM is largely confined to the intravascular pool and is the predominant early antibody.

IgA represents 15-20% of human serum immunoglobulin pool. More than 80% of IgA occurs as a monomer. However, some of the IgA (secretory IgA) exists as a dimeric form.

IgD accounts for less than 1% of the total plasma immunoglobulin. IgD is found on the surface membrane of maturing B-cells.

IgE, although scarce in normal serum, is found on the surface membrane of basophils and mast-cells. It is associated with allergic diseases such as asthma and hay-fever.

In addition to the five main class or classes, there are four subclasses for IgG (IgG1, IgG2, IgG3 and IgG4). Additionally there are two subclasses for IgA (IgA1 and IgA2).

There are two types of light chain: lambda (λ) and kappa (κ). There are approximately twice as many κ as λ molecules produced in humans, but this is quite different in some mammals. Each chain contains approximately 220 amino acids in a single polypeptide chain that is folded into one constant and one variable domain. Plasma cells produce one of the five heavy chain types together with either κ or λ molecules. There is normally approximately 40% excess free light chain production over heavy chain synthesis. Where the light chain molecules are not bound to heavy chain molecules, they are known as "free light chain molecules". The κ light chains are usually found as monomers. The λ light chains tend to form dimers.

There are a number of proliferative diseases associated with antibody producing cells.

In many such proliferative diseases a plasma cell proliferates to form a monoclonal tumour of identical plasma cells. This results in production of large amounts of identical immunoglobulins and is known as a monoclonal gammopathy.

Diseases such as myeloma and primary systemic amyloidosis (AL amyloidosis) account for approximately 1.5% and 0.3% respectively of cancer deaths in the United Kingdom. Multiple myeloma is the second-most common form of haematological malignancy after non-Hodgkin lymphoma. In Caucasian populations the incidence is approximately 40 per million per year. Conventionally, the diagnosis of multiple myeloma is based on the presence of excess monoclonal plasma cells in the bone marrow, monoclonal immunoglobulins in the serum or urine and related organ or tissue impairment such as hypercalcaemia, renal insufficiency, anaemia or bone lesions. Normal plasma cell content of the bone marrow is about 1%, while in multiple myeloma the content is typically greater than 10%, frequently greater than 30%, but may be over 90%.

AL amyloidosis is a protein conformation disorder characterised by the accumulation of monoclonal free light chain fragments as amyloid deposits. Typically, these patients present with heart or renal failure but peripheral nerves and other organs may also be involved.

There are a number of other diseases which can be identified by the presence of monoclonal immunoglobulins within the blood stream, or indeed urine, of a patient. These include plasmacytoma and extramedullary plasmacytoma, a plasma cell tumour that arises outside the bone marrow and can occur in any organ. When present, the monoclonal protein is typically IgA. Multiple solitary plasmacytomas may occur with or without evidence of multiple myeloma. Waldenström's macroglobulinaemia is a low-grade lymphoproliferative disorder that is associated with the production of monoclonal IgM. There are approximately 1,500 new cases per year in the USA and 300 in the UK. Serum IgM quantification is important for both diagnosis and monitoring. B-cell non-Hodgkin lymphomas cause approximately 2.6% of all cancer deaths in the UK and monoclonal immunoglobulins have been identified in the serum of about 10-15% of patients using standard electrophoresis methods. Initial reports indicate that monoclonal free light chains can be detected in the urine of 60-70% of patients. In B-cell chronic lymphocytic leukaemia monoclonal proteins have been identified by free light chain immunoassay.

Additionally, there are so-called MGUS conditions. These are monoclonal gammopathy of undetermined significance. This term denotes the unexpected presence of a monoclonal intact immunoglobulin in individuals who have no evidence of multiple myeloma, AL amyloidosis, Waldenström's macroglobulinaemia, etc. MGUS may be found in 1% of the population over 50 years, 3% over 70 years and up to 10% over 80 years of age. Most of these are IgG- or IgM-related, although more rarely IgA-related or bi-clonal. Although most people with MGUS die from unrelated diseases, MGUS may transform into malignant monoclonal gammopathies.

In at least some cases for the diseases highlighted above, the diseases present abnormal concentrations of monoclonal immunoglobulins or free light chains. Where a disease produces the abnormal replication of a plasma cell, this often results in the production of more immunoglobulins by that type of cell as that "monoclone" multiplies and appears in the blood.

Immunofixation electrophoresis uses a precipitating antibody against the immunoglobulin molecules. Whilst this improves the sensitivity of the test it cannot be used to quantify monoclonal immunoglobulins because of the presence of the precipitating antibody. Immunofixation electrophoresis is also rather laborious to perform and interpretation may be difficult. Capillary zone electrophoresis is used in many clinical laboratories for serum protein separation and is able to detect most monoclonal immunoglobulins. However, when compared with immunofixation, capillary zone electrophoresis fails to detect monoclonal proteins in 5% of samples. These so-called "false negative" results encompass low-concentration monoclonal proteins.

Total κ and λ assays have been produced. However, total κ and total λ assays are too insensitive for the detection of monoclonal immunoglobulin or free light chain. This is due to high background concentrations of polyclonal bound light chains which interfere with such assays.

More recently, a sensitive assay has been developed that can detect the free κ light chains and separately, the free λ light chains. This method uses a polyclonal antibody directed towards either the free κ or the free 2 light chains. The possibility of raising such antibodies was also discussed as one of a number of different possible specificities, in WO 97/17372. This document discloses methods of tolerising an animal to allow it to produce desired antibodies that are more specific than prior art techniques could produce. The free light chain assay uses the antibodies to bind to free λ or free κ light chains. The concentration of the free light chains is determined by nephelometry or turbidimetry. This involves the addition of the test sample to a solution containing the appropriate antibody in a reaction vessel or cuvette. A beam of light is passed through the cuvette and as the antigen-antibody reaction proceeds, the light passing through the cuvette is scattered increasingly as insoluble immune complexes are formed. In nephelometry, the light scatter is monitored by measuring the light intensity at an angle away from the incident light, whilst in turbidimetry light scatter is monitored by measuring the decrease in intensity of the incident beam of light. A series of calibrators of known antigen (i.e. free κ or free λ) concentration are assayed initially to produce a calibration curve of measured light scatter versus antigen concentration.

This form of assay has been found to successfully detect free light chain concentrations. Furthermore, the sensitivity of the technique is very high.

The characterisation of the amount or types of free-light chains (FLC), heavy chain or subclasses, or light chain-type bound to heavy chain class or subclass, is important in a wide range of diseases including B cell diseases such as multiple myeloma and other immune mediated diseases such as nephropathy.

WO2015/154052, incorporated herein in its entirety, discloses methods of detecting immunoglobulin light chains, immunoglobulin heavy chains, or mixtures thereof, using mass spectrometry (MS). Samples comprising immunoglobulin light chains, heavy chains or mixtures thereof are immunopurified and subjected to mass spectrometry to obtain a mass spectrum of the sample. This can be used to detect monoclonal proteins in samples from patients. It can also be used to fingerprint, isotype and identify disulphide bonds in monoclonal antibodies.

MS is used to separate, for example, lambda and kappa chains in the sample by mass and charge. It may also be used to detect the heavy chain component of immunoglobulins, by, for example reducing the disulphide bonds between heavy and light chains using a reducing agent. MS is also described in WO 2015/131169, herein incorporated in its entirety.

The purification of immunoglobulins in a sample in diagnostic procedures, typically uses anti-whole antibodies, such as anti-IgG or anti IgA antibodies or anti-free light chain antibodies, such as anti-κ or anti-λ light chain antibodies.

A problem with this technique is that light chains or heavy chains from the purifying antibodies themselves can be released into the sample to be tested. This contamination can affect the accuracy of the subsequent characterisation of the sample.

As indicated above, the heavy chains and light chains of antibodies are normally attached together via disulphide bonds. These bonds are relatively weak and can be broken to release the heavy chain and light chains from each other.

WO2006/099481A describes the use of intra- and inter-chain thioether cross links in a wide range of macromolecules including polypeptides such as polyclonal antibodies, monoclonal antibodies, Fab, F(ab) and F(ab')$_2$ fragments, single chain antibodies, human antibodies, harmonised or chimeric antibodies and epitope binding fragments. The document describes that the aim of the cross-linking is to enhance the stability and pharmaceutical and functional properties of the antibody or fragment. In particular, the aim is to cross-link, for example, the heavy and light chains of different monoclonal antibodies, such as anti-viral antigen antibodies, including anti-RSV antibodies. The stated aim is to improve the pharmaceutical properties of the antibodies.

WO00/44788 describes using thioethers to cross-link different antibody molecules of different specificities with the aim of producing improved therapeutic agents. Similarly, bi- or tri-specific F(ab)$_3$ or F(ab)$_4$ conjugates with different specificities are shown in WO91/03493.

Thioethers have been observed in therapeutic antibodies with increasing levels on storage (Zhang Q et al JBC manuscript (2013) M113.468367). A light chain-heavy chain disulphide (LC214-HC220) can convert to a thioether bond. One IgG1k therapeutic antibody was observed to convert to a thioether at that position at a rate of 0.1% per day whilst circulating in blood. Endogenous antibodies were also observed to be formed in healthy human subjects. Zhang et al repeated the thioether formation in vitro. This was used to help assess the safety impact of the thioether bonds on therapeutic monoclonal antibodies.

In contrast to Zhang which considered the formation of cross-links to be problematic, the Applicant has realised that for some uses the formation of cross-linked antibodies can have unexpected advantages.

The Applicant has realised that reducing the amount of contamination, such as the release of free light chains from intact immunoglobulins, F(ab) or F(ab')$_2$ fragments or releasing nanobodies from the bead, from purifying antibodies would be beneficial.

The invention provides:

an anti-immunoglobulin specific antibody (or fragment thereof), characterised that the antibody (or fragment thereof) comprises one or more non-disulphide cross-links between at least one heavy chain (or fragment thereof) and at least one light chain (or fragment thereof) of the antibody (or fragment thereof). Cross-links between adjacent heavy chains may also be provided in addition to or instead of the native heavy chain-light chain disulphide cross-links.

The cross-links are typically intramolecular between chains of the same antibody The cross-link typically comprises a thioether bond.

A thioether cross-link comprises a thioether bond. This is a link between residues of the antibody wherein the link has a single sulphur bond rather than a disulphate bond. That is thioether cross-links do not include links that comprise more than one sulphur atom, such as disulphide bridges that are familiar to those skilled in the art. Instead, a thioether cross-link comprises a single sulphur bond that bridges residues of a macromolecule. One or more additional non-sulphur atoms may additionally form the link.

The residues linked by thioether cross-links can be natural residues or non-natural residues. Formation of the thioether cross-link can result in a loss of atoms from the residues, as will be recognised by those skilled in the art. For example, formation of a thioether cross-link between side chains of two cysteine residues can result in loss of a sulphur atom and hydrogen atoms from the residues, yet the resulting thioether cross-link will be recognised as linking the cysteine residues by one skilled in the art.

Thioether cross-links can link any two residues of the antibody. One or more of the residues may be selected, for example, from cysteine, aspartic acid, glutamic acid, histidine methionine and tyrosine. Two of the residues may be selected from the group consisting of cysteine, aspartic acid, glutamic acid, histidine, methionine and tyrosine. More typically two of the residues are cysteine residues. Typically, only one thioether cross-link is between the heavy chain and the light chain. Alternatively, two, three or more thioether cross-links may be used. The heavy chain pair of the antibody, or a fragment thereof, may also be linked by one or more non-disulphide cross-links, such as thioether bonds.

Thioether cross-links are described in, for example, WO2006/099481, and Zhang et al (2013) J. Biol. Chem. vol 288 (23), 16371-8 and Zhang & Flynn (2013) J. Biol. Chem, vol 288 (43), 34325-35 incorporated herein by reference.

Phosphines and phosphites may be used. Here, 'phosphine' refers to any compound containing at least one functional unit with the general formulae $R_3P$ (where P=phosphorous and R=any other atom). In phosphites, the R positions are occupied specifically by oxygen atoms. $R_3P$-containing compounds act as strong nucleophiles that can attack disulphide bonds. This can result in reduction of disulphides, however under some conditions, may also result in thioether bond formation.

Compounds include:
Tris(dimethylamino)phosphine (CAS Number 1608-26-0)
Tris(diethylamino)phosphine (CAS Number 2283 Nov. 6)
Trimethylphosphite (CAS Number 121-45-9)
Tributylphosphine (CAS Number 998-40-3)
References: Bernardes et al. (2008) *Angew. Chem. Int. Ed.*, vol 47, 2244-2247 incorporated herein by reference Cross-links may also comprise cross-linkers such as a maleimide cross-linker, which reacts with free thiols to cross-link to chains of the antibody molecule. This can be made to bind on one side of a thiol group and additionally on another moiety such as a lysine carboxyl group, as described in WO00/44788.

Bi-functional cross-linkers may be used comprising two reactive moieties linked together by a linker, especially a flexible linker. The linker may comprise one or more carbons covalently bound together in a chain, for example a substituted or non-substituted alkyl. The linker especially a C1-C10, most typically a C2-C6 or C3-C6 linker. The Applicants have found that C2-C6 containing cross linkers, such as, α,α'-Dibromo-m-xylene, BMOE (bismaleimidoethane) or BMB (bismaleimidobutane) particularly useful with relatively high levels of recovery of cross-linked protein.

Bismaleimide is a Homobifunctional Sulfhydryl Reactive Crosslinker

This is a well characterised class of cross-linker contains two maleimide groups connected by a hydrocarbon or other linker. The maleimide groups spontaneously react with free sulfhydryl groups exposed by reduction of disulphides to form a non-reducible thioether bond at each sulfhydryl, thereby covalently crosslinking the two remaining cystines.

Compounds include:
Bis(maleimido) ethane (CAS Number 5132-30-9)
1,4-bis(maleimido) butane (CAS Number 28537-70-4)

REFERENCES

Auclair et al. (2010) Strategies for stabilizing superoxide dismutase (SOD1), the protein destabilized in the most common form of familial amyotrophic lateral sclerosis. *Proc Natl Acad Sci USA*, vol 107 (50)—pages 21394-9

Geula at al. (2012) Structure-based analysis of VDAC1 protein: defining oligomer contact sites. *J Biol Chem*, vol 287 (3), 475-85

Kida et al. (2007) Two translocating hydrophilic segments of a nascent chain span the ER membrane during multispanning protein topogenesis. *J Cell Biol*, vol 171 (7) pages 1441-1452 incorporated herein by reference α,α'-Dibromo-m-xylene is a Homobifunctional Sulfhydryl Reactive Crosslinker which May Also be Used Dibromo-m-xylene (CAS Number 626-15-3) is a member of the di-alkyl halide class of compounds and acts as a homobifunctional crosslinker that reacts with free sulfhydryl groups.

REFERENCE

Jo et al. (2012) Development of α-Helical Calpain Probes by Mimicking a Natural Protein-Protein Interaction *J Am Chem Soc.*, col 134 (42)—pages 17704-13 incorporated herein by reference.

Alternative Sulfhydryl Reactive Cross-Linking Compounds Forming Stable Thioether Bonds There are at least six classes of reagent known to react with free sulfhydryls and result in a non-reducible covalently cross-linked product. The specific reactivity of these compounds to sulfhydryl groups varies and some will react with water, amines and carboxyl groups under certain conditions. In addition, many of these compounds have bulky linker groups, which may limit their ability to cross-link in restricted spatial environments. The list below gives a few examples from each class, but a more comprehensive list and references is given in:

Chemistry of Protein Conjugation and Cross-linking, Wong, S: ISBN 0-8493-5886-8 incorporated herein by reference Bismaleimides
bis(maleimido) hexane; N—N'-methylenebismaleimide; Bis(N-maleimidomethyl) ether; N,N'-(1,3-phenylene)-bis-maleimide; bis(N-maleimido)-4,4'-bibenzyl; naphthalene-1,5-dimaleimide Haloacetyl Derivatives
1,3-dibromoacetone; N,N'-bis(iodoacetyl) polmethylenediamine; N,N'-di(bromoacetyl)phenylhydrazine; 1,2-di(bromoacetyl)amino-3-pheylhydrazine; Y-(2,4-dinitrophenyl)-α-bromoacetyl-L-diaminobutyric acid bromoacetylhydrazide Di-Alkyl Halides α,α'-dibromo-p-xylene sulfonic acid; α,α'-diiodo-p-xylene sulfonic acid; di(2-chloroethyl) sulphide; tri (2-chloroethyl)amine; N,N-bis(β-bromoethyl)benzylamine 2.4 s-Triazines Dichloro-6-methoxy-s-triazine; 2,4,6-trichloro-s-triazine (cyanuric acid); 2,4-dichloro-6-(3'-methyl-4-aminoanilino)-s-triazine; 2,4-dichloro-6-amino-s-triazine Aziridines 2,4,6-tri (ethyleneimido)-s-triazine; N,N'-ethyleneiminoyl-1,6-diaminohexane; tri[1-(2-methylaziridenyl)]-phosphine oxide Bis-Epoxides 1,2:3,4-diepoxybutane; 1,2:5,6-diepoxyhexane; bis(2,-epoxypropyl) ether; 1,4-butadioldiglycidoxyether The cross-link may replace one or more naturally occurring disulphide bonds or alternatively may be produced in addition to the disulphide bond.

Typically at least 50%, at least 60%, at least 70%, at least 80%, at least 90% or at least 95% of the antibodies are cross-linked. Cross linking efficiencies of 70%-80% have been observed using, for example, bismaleimide. The cross-linked antibodies may be further purified to produce higher levels of cross-linking, for example by adding a reducing agent to break the disulphide bonds of remaining non-cross-linked antibodies and separating using, for example, gel electrophoresis.

The antibody or fragment may be anti-free light chain specific (such as anti-kappa free light chain or anti-lambda free light chain), anti-heavy chain subclass specific, anti-heavy chain type specific or anti-heavy chain class-light chain type specific.

Heavy chain classes may be IgG, IgA, IgM, IgD or IgE, typically IgG or IgA.

Heavy chain subclasses include IgA1, IgA2, IgG1, IgG2, IgG3 and IgG4.

The antibodies may be species specific, such as anti-human or anti-horse or anti-sheep or anti-pig. The antibody may be raised in a cartilaginous fish, sheep, goat, horse, rabbit, cow, camelids such as llamas, rats or mouse.

The antibodies or fragments of the invention are capable of specifically binding immunoglobulins.

Typically the antibody or fragment is attached to a support. This may be, for example, any suitable chromatographic support generally known in the art for protein purification, such as an immuno-purification of antibodies or fragments. These include: magnetic beads, agarose resins and other supports generally known in the art. The covalent and non-covalent attachment of antibodies to supports is generally known in the art. This may be achieved, for example by reacting free amine groups on the antibodies with a support activated with and agent such as cyanogen bromide, N-hydroxysuccinimide (sulfo-NHS) or tresyl chloride. The water soluble carbodiimide, EDC, may be used to form active ester functionalities with carboxylate groups using sulfo-NHS. The use of biotinylated antibodies or supports to bind to the counterpart streptavidin moieties on the other of the support or antibodies has also be used in the art.

The antibody or fragment thereof may be a monoclonal antibody. Alternatively, the antibody or fragment may be a polyclonal antibody or fragment.

A mixture of antibodies, or fragments, having different specificities may be provided.

The fragment of the antibody may, for example, be a F(ab')$_2$ fragment.

The antibodies or fragments of the invention may be used in the purification of one or more immunoglobulins or in the removal of undesirable proteins which may foul mass spec analysis. Accordingly, a further aspect of the invention provides a method of purifying or characterising an immunoglobulin comprising contacting a sample containing the immunoglobulin with an antibody or fragment according to the invention, allowing immunoglobulin to bind to the antibody or fragment; washing unbound material away from the immunoglobulin bound to the antibody or fragments; and removing or eluting the bound immunoglobulin from the antibody or fragment to produce purified immunoglobulin. This purified immunoglobulin may be further characterised, for example, using mass-spectroscopy.

The sample may be a sample of bodily fluid or tissue. This includes, for example, whole blood, serum, plasma, cerebrospinal fluid or urine.

Assay kits for use in the purification of immunoglobulins for use in mass spectrometry are also provided. These typically comprise an antibody or fragment according to the invention and one or more mass spectrometry standards. Such standards provide an internal standard to give an indication of the size of the analytes detected by mass spectrometry.

The Applicants have also realised that a suitable standard, also known herein as a control, within the subject sample to be tested, would provide an internal standard amount of immunoglobulin against which the amount of immunoglobulin from the subject sample can be quantified. Moreover, if that standard is placed within the sample from the subject during the purification of the immunoglobulin prior to quantifying it, any changes in the immunoglobulin or losses, due to the purification process can be taken account of.

Moreover, the presence of a control within the sample also assists in removing errors caused by the sample itself when spotted onto a mass spectrometry target. For example, in MALDI-TOF MS the sample is usually spotted onto the target and dried. The distribution of immunoglobulin across the dried sample is not uniform. The presence of the control ensures that when ionised by laser a comparable sample of both the immunoglobulin being tested and the control is removed from the region ionised by the laser. Conventionally computers use a median peak intensity leading to inaccuracies. The control removes some of the inaccuracies and assists in the production of quantitative, rather than qualitative measurement of the immunoglobulin.

The invention therefore provides a method of quantifying an amount of a subject analyte, or a fragment of an analyte in a sample from the subject comprising:

(i) adding to the sample a predetermined amount of one or more control analytes or fragments, which are distinguishable from the equivalent subject analyte or fragment;

(ii) measuring the relative amount of the subject analyte or fragment and the amount of the control analyte or fragment in the sample; and (iii) comparing the relative amount of subject analyte or fragment to the relative amount of control analyte or fragment, to quantify the amount of analyte or fragment in the original subject sample.

Two or more different control analytes may be used. These may be at different concentrations to allow improved accuracy of quantification of the analyte of interest Potentially the quantification technique used to quantify the analyte may be any suitable techniques generally known in the art for quantification of immunoglobulins and their fragments. However, most typically immunoglobulins or fragments are detected. The analyte may be measured using mass spectrometry. The control analyte is typically distinguishable from the subject analyte by using the mass spectrometry.

The control analyte may be added to a sample from the subject containing the subject's analyte, prior to one or more steps, such as purification steps, to act as an internal control whilst the subjects sample is being prepared for subsequent detection of the analyte.

This uses, for example a higher or lower molecular weight version of the analyte and/or one with a different charge to the analyte being assayed in a subject. This may for example be an immunoglobulin or a fragment of an immunoglobulin. However, potentially any analyte, including proteins, peptides, nucleic acids or glycoproteins may be the analyte. Typically the molecular weight is above 500 Da, or above 100 Da, above 1500 Da, above 5 kDa, most typically above 10 kDa. The control analyte may be detectable by having a different charge or molecular weight to shift the control analyte away from an analyte peak observed for the equivalent subject analyte, so that both the control and subject analyte may be measured separately For example, if the immunoglobulin is intact immunoglobulin, then the control immunoglobulin may be a higher or lower molecular weight version of intact immunoglobulin. If, for example, the immunoglobulin in a subject being quantified is lambda or kappa light chains, then higher or lower molecular weight lambda or kappa light chains are used in the control. The control intact immunoglobulin or heavy chain detected may be the same class of immunoglobulin (such as IgA, IgD, IgE, IgM, or IgG) as that of the subject being quantified.

Higher or lower molecular weight or charge on the control means that in many assays the observed position of the control analyte such as the immunoglobulin or fragment is shifted relative to the subject's analyte or fragment. This allows, for example, a separate peak or position of the control to be determined and measured. As the amount of control analyte or fragment is predetermined prior to adding to the sample, then if the amount of subject analyte or fragment is determined and compared to the known amount of control analyte or fragment, then the subject analyte or fragment can be quantified. As some techniques, such as MS also use charge to assist in detecting the analyte, the charge may also be varied.

The control may be a monoclonal intact immunoglobulin, heavy chain, kappa light chain or lambda light chain, Fc fragment or Fab fragment. Such monoclonal proteins are, by definition, proteins derived from clonal cells producing a single form of the protein. The protein therefore may be used as it has a predefined molecular mass and will be detected at a predetermined peak on a mass spectrogram. Where the protein being detected from the patient is immunoglobulins, or fragments of immunoglobulins, these may be polyclonal in nature and will therefore have very many different molecular masses individually at relatively low concentrations, due to the high variability between different immunoglobulins and the different antigen binding domains of those immunoglobulins or fragments. Hence, mass spectrometry of polyclonal proteins produces a range of different sized immunoglobulins from the subject which are detected by the mass spectrometry. The use of a monoclonal protein, or fragments, of predetermined size produces a defined peak within that range of proteins from the subject which is readily distinguishable and can be used as the control. Where the protein being detected is a monoclonal immunoglobulin, this will be readily distinguishable from the control due to the unique nature of the individual monoclonal protein.

The subject may be a patient with a plasma cell associated disease such as a monoclonal gammopathy. This includes MGUS, AL amyloidosis, myeloma (such as multiple myeloma), plasmacytoma, Waldenström's macroglobulinaemia, and lymphomas (such as B cell non-Hodgkin lymphoma).

Two or more different control analytes may be used to allow the simultaneous detection of two of more different analytes from the same sample.

MS as used herein includes, for example, liquid chromatography-mass spectrometry (LC-MS), microflow liquid chromatography electrospray ionisation coupled to a quadrupole time-of-flight mass spectrometry (micro LC-ESI-Q-TOF MS). This may include, for example, the use of positive ion mode.

Alternatively, the mass spectrometry technique includes a matrix assisted laser desorption ionisation-time-of-flight mass spectrometry (MALDI-TOF-MS). An orbitrap mass spectrometer may also be used The increase in the size of the control molecular weight or charge, for example, means that the peak in the mass spectrometry readout for the analyte such as immunoglobulin or fragment is shifted compared to the equivalent subject's immunoglobulin or fragment.

The control immunoglobulin or fragment may be intact immunoglobulin (with one or more light chains attached to one or more heavy chains), a heavy chain, a lambda light chain or a kappa light chain, such as a lambda free light chain or kappa free light chain. Fragments of antibodies such as Fc or Fab fragments may also be detected.

The control analyte such as immunoglobulin may have a higher molecular weight compared to the subject analyte such as immunoglobulin by virtue of the conservative substitution of one or more amino acids within the analyte such as immunoglobulin.

Examples of conservative amino acid substitutions include:

| Residue | Conservative Substitutions |
| --- | --- |
| Ala | Ser |
| Arg | Lys |
| Asn | Gln; His |
| Asp | Glu |
| Gln | Asn |
| Cys | Ser |
| Glu | Asp |
| Gly | Pro |
| His | Asn; Gln |
| Ile | Leu, Val |
| Leu | Ile; Val |
| Lys | Arg; Gln |
| Met | Leu; Ile |
| Phe | Met; Leu; Tyr |
| Ser | Thr; Gly |
| Thr | Ser; Val |
| Trp | Tyr |
| Tyr | Trp; Phe |
| Val | Ile; Leu |

One problem associated with such conservative substitutions is that they potentially effect the structure of the control immunoglobulin compared to the structure of the subject immunoglobulin. This may be, for example, through the folding of the immunoglobulin or alternatively simply due to the addition of one or more different side groups to the protein chain making up the epitopes on the surface of the immunoglobulin.

Typically, the analyte, such as immunoglobulins from samples are purified to some extent prior to assaying for the analyte such as immunoglobulin as described above.

A sample from a subject may potentially be a sample of a tissue or a biological fluid. The biological fluid may, for example, be blood, serum, plasma, urine, saliva or cerebrospinal fluid. Most typically the sample is blood, serum or plasma. The biological sample can be from a subject that has analytes such as immunoglobulins which includes, but is not limited to, a mammal such as a human, dog, cat, primate, rodent, pig, sheep, cow or horse.

The sample may be treated to remove components that could interfere with, for example, the mass spectrometry technique. For example, the sample may be centrifuged, filtered or subjected to chromatographic techniques to remove interfering components, such as from cells or cell or tissue fragments. For example, whole blood samples can be treated using conventional clotting techniques to remove red and white blood cells and platelets. A sample can also be de-proteinised. For example, a plasma sample can have serum proteins precipitated using conventional reagents such as acetonitrile, KOH, NaOH, optionally followed by centrifugation of the sample. Immunoglobulins for example can be isolated from samples or enriched in a sample using standard methods. Such methods include, for example, removing one or more non-immunoglobulin contaminants from a sample. Alternatively, samples can be enriched or purified using immunopurification, centrifugation, filtration, water filtration, dialysis, ion exchange chromatography, size exclusion chromatography, protein A/G affinity chromatography, affinity purification, precipitation, gel electrophoresis, capillary electrophoresis or chemical fractionation.

Typically, the control analyte is added to the sample prior to at least one or those purification techniques. That is it is included within the subject analyte sample prior to undergoing a purification or concentration of the immunoglobulins within the sample, for example by the methods described above. That is typically before techniques are used in addition to the mass spectrometry methods used for detection of the analyte, such as immunoglobulins, such as by LC-MS, orbitrap MS or MALDI-TOF MS. The advantage of incorporating this within the sample is that the control analyte acts as an internal control through the purification process of the sample. A known amount of the control analyte or fragment is added to the sample and this can be used as a positive control to confirm that the purification steps have been successful, or to identify where problems have occurred during the purification of the analyte in the subject sample.

Because the control immunoglobulin is typically used within the purification processes for the subject's immunoglobulin, use of conserved amino acid substitutions within for example the chain of immunoglobulin or fragment, may affect the way that control immunoglobulin or fragment is purified compared to the subject's immunoglobulin or fragment. That is for example, where an affinity purification step, such as immunopurification, is used, subtle differences with the structure of the immunoglobulin may affect the ability to be co-purified with the subject immunoglobulin.

Accordingly, most typically the control immunoglobulin comprises a plurality of additional amino acids at the N or more typically the C-terminal end of the immunoglobulin compared to the equivalent subject immunoglobulin. That is typically there are 5, 10, 15, 20 or more extra amino acids to increase the molecular weight of the immunoglobulin or fragment compared to the equivalent subject immunoglobulin or fragment.

In one embodiment by equivalent analytes, such as immunoglobulin or fragment, we mean that where the sample to be detected is intact analyte such as immunoglobulin, the additional increased molecular weight or charge is provided on intact analyte such as immunoglobulin purified from an alternative source than the subject. This may, for example, be polyclonal or monoclonal immunoglobulin or polyclonal immunoglobulin. Where, for example, the intact immunoglobulin or heavy chain immunoglobulin to be detected is IgA, IgG, IgM, IgD or IgE, the intact immunoglobulin or heavy chain of the control is from the same immunoglobulin type, that is IgA, IgG, IgM, IgD or IgE as the subject immunoglobulin or heavy chain to be detected.

Similarly, where kappa light chains or lambda light chains are detected in the sample, then the control immunoglobulin uses kappa light chains or lambda lights chains of heavier molecular weight.

The control analyte containing additional amino acids or indeed conserved amino acids, may be produced recombinantly. For example, a nucleic acid sequence encoding a protein such as an immunoglobulin heavy chain or light chain may have a plurality of codons added to the N-terminal or C-terminal coding region, to increase the number of amino acids produced recombinantly within a suitable host cell such as a prokaryotic or more typically a eukaryotic host cell or in cell free systems. The amino acids may, for example, be any suitable naturally or non-naturally amino acid, but typically alanine, for example, to produce polyalanine C or N terminus.

The production of recombinant antibodies or fragments thereof is generally known. See for example the reviews by Frenzel A. et al (Frontiers in Immunology (2013), 4, Article 217) and Stech M. and Kubick S. (Antibodies (2015), 4, 12-33) incorporated herein by reference.

A plurality of different control analytes, such as immunoglobulins or fragments, may be added to the sample from the subject. For example, the sample from the subject may have the kappa free light chains and lambda free light chains measured. Accordingly, the control immunoglobulin or fragment would include a control free lambda light chain and a control free kappa light chain. Similarly, if the heavy chain intact immunoglobulin or the heavy chain is to be measured, then the control may additionally include, suitable control heavy chain or control intact immunoglobulin.

Alternatively the control may be a monoclonal antibody or fragment having a predetermined higher or lower molecular weight than the part of the immunoglobulin being assayed. The production of monoclonal antibodies is generally known. For example, a commercially available monoclonal antibody may be selected on the basis of its molecular weight to be the control. It may, for example, be harmonised to allow it to be copurified with antibodies from a sample from a human.

The control may be used with a cross-linked antibody as defined above.

Accordingly, a further aspect of the invention provides a method of preparing a sample for mass spectrometry comprising:
 (i) providing a sample from a subject comprising one or more analytes, which are typically immunoglobulins or fragments;
 (ii) adding to the sample a predetermined amount of one or more control analytes or fragments thereof, typically immunoglobulins or fragments thereof;

(iii) copurifying at least a portion of the analyte, typically immunoglobulins or fragments, from the subject and control analyte, typically immunoglobulins or fragments, with a cross-linked antibody or fragment as defined above; and optionally (iv) placing a portion of the copurified analyte, such as immunoglobulins or fragments, onto a mass spectrometry target.

The mass spectrometry target may then be placed in a mass spectrometer and analysed using the mass spectrometer. The target is typically the substrate on which the sample is placed and then subsequently placed in the mass spectrometer for the sample to be subjected to mass spectrometry analysis.

Mass spectrometers comprising within them one or more control analytes or fragments thereof are also provided.

The sample, mass spectrometers, immunoglobulins and controls may be as defined herein.

Assay kits comprising a cross-linked antibody or fragment as defined herein and a control analyte such as immunoglobulin or fragment, as defined herein are also provided. The kit may additionally comprise a mass spectrometry target and/or buffers or salts may be provided.

Methods of performing mass spectrometry comprising the use of the assay kit is also provided.

Methods of diagnosing B cell-related diseases or other immune-related diseases comprising purifying and characterising an immunoglobulin using an antibody of the invention, a method of the invention and/or an assay kit according to the invention are also provided.

B cell-related diseases include, for example, the diagnosis of intact immunoglobulin multiple myeloma (MM), light chain MM, non-secretory MM, AL amyloidosis, light chain deposition disease, smouldering MM, plasmacytoma and MGUS (monoclonal gammopathies of undetermined significance). This may also be used in the diagnosis of other B cell dyscrasias or the diagnosis or prognosis of a number of other disorders such as PTLD as described in WO2013/088126, or cancer, diabetes, heart disease or renal disease (WO2011/095818, WO2013/050731, EP1870710, WO2011/107965) incorporated herein by reference.

A number of other diseases are also usefully characterised by the identification and characterisation of antibodies from samples from a patient. These include: rheumatoid arthritis, coeliac disease, Graves' disease, pernicious anaemia, Sjögren syndrome and systemic lupus erythematosus.

The invention will now be described by way of example only, with reference to the following figures:

FIG. 1 shows Coomassie Blue stained gels illustrating the formation of thioether bonds in anti-free kappa F(ab')$_2$ and anti-free lambda F(ab')$_2$ antibody fragments. The formation of cross-linked light and heavy chains of the F(ab')$_2$ molecule are indicated in the SDS-PAGE gel image (arrow at approximately 50 kDa). The degree of cross-linking is higher at 7 days.

FIG. 2 shows Coomassie Blue stained gels of treated (to induce thioether bond formation) and non-treated anti-free kappa F(ab')$_2$ fragments. (NR) non-reduced samples (R) reduced samples. Interpretation of the structures in each band is also shown.

FIG. 3 similarly shows anti-free lambda F(ab')$_2$ antibody fragments.

Figure 10:
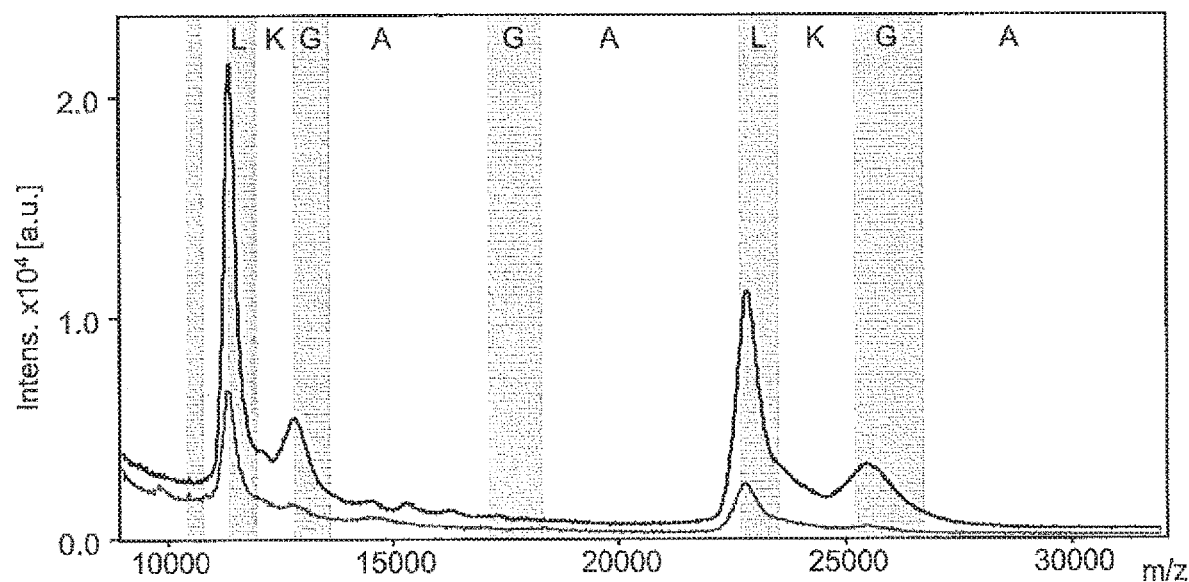

FIG. 10 shows the MALDI mass spectra of anti-IgG3 conjugated sepharose (black line) and thioether cross-linked anti-IgG3 conjugated sepharose (grey line) eluted with 5% Acetic Acid containing 50 mM tris(2-carboxyethyl)phosphine (TCEP) in the absence of prior sample addition. The mass/charge ranges for lambda light chain (L), kappa light chain (K), IgG heavy chain (G) and IgA heavy chain (A) are shown.

Figure 11:
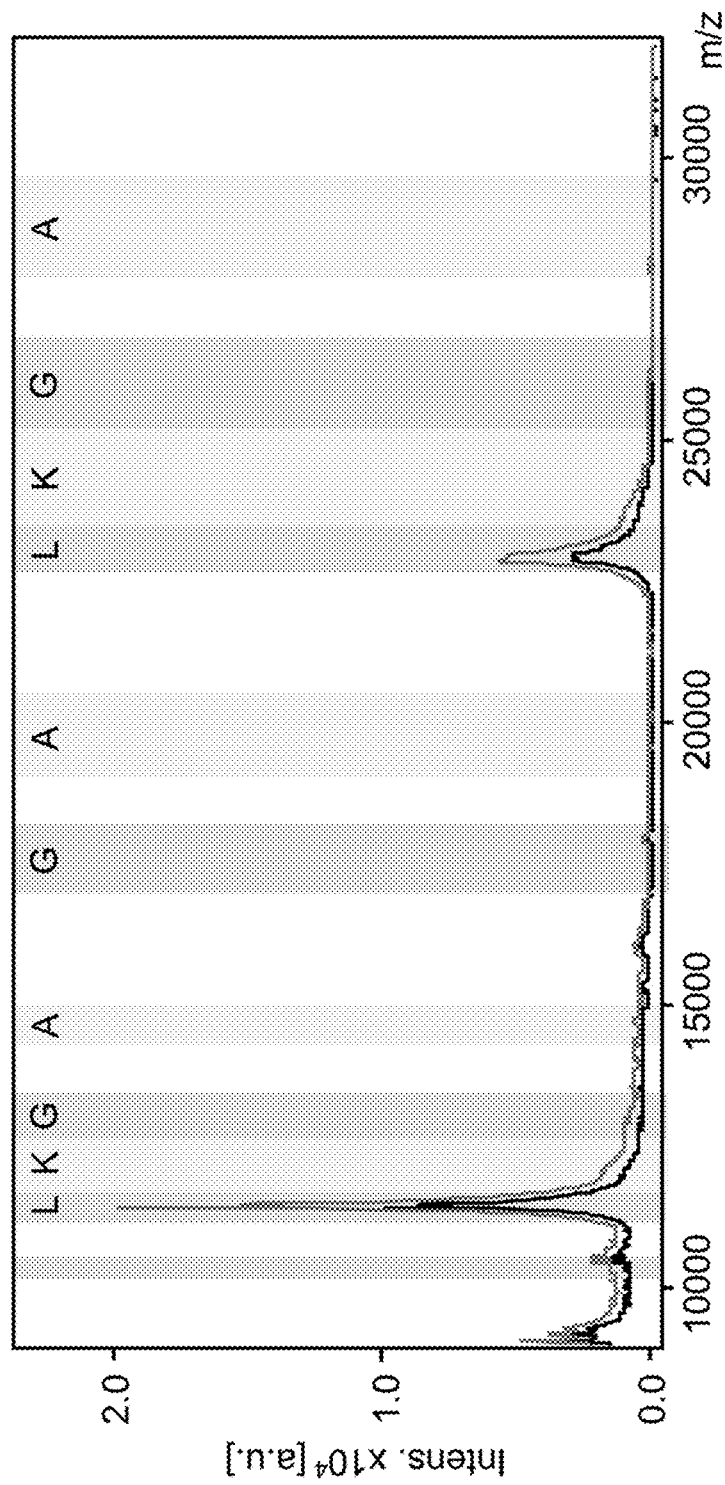

FIG. 11 shows the MALDI mass spectra of anti-IgG3 conjugated sepharose (black line) and thioether cross-linked anti-IgG3 conjugated sepharose (grey line) eluents after incubation with human serum containing elevated IgG3 and elution with 5% Acetic Acid containing 50 mM TCEP. The mass/charge ranges for lambda light chain (L), kappa light chain (K), IgG heavy chain (G) and IgA heavy chain (A) are shown.

Figure 12:
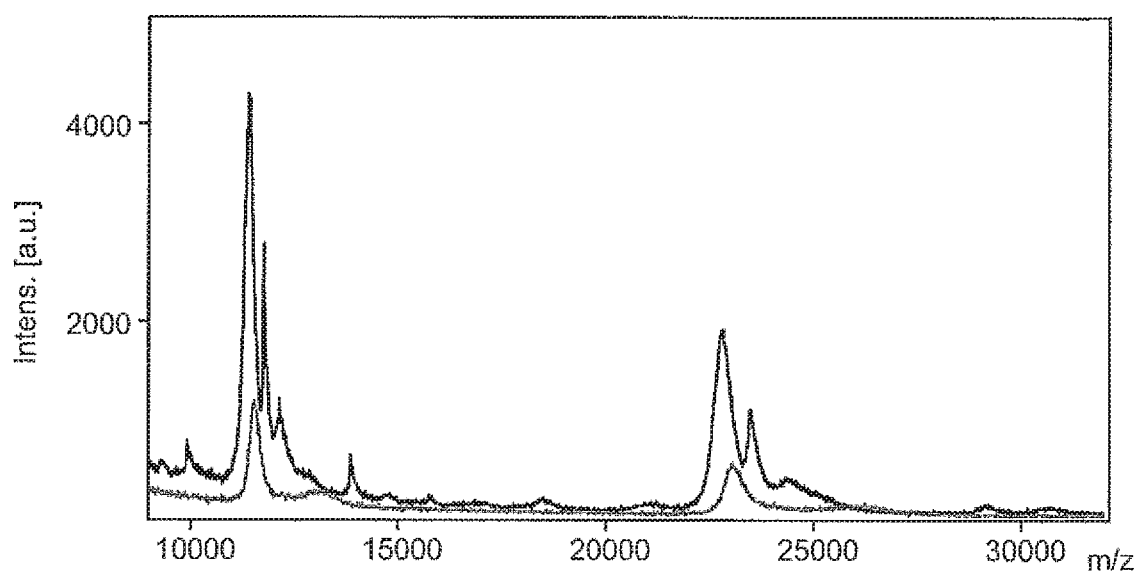

FIG. 12 shows the MALDI mass spectra of anti-free kappa conjugated sepharose (black line) and BMOE cross-linked anti-free kappa conjugated sepharose (grey line) eluted with 5% Acetic Acid containing 50 mM TCEP in the absence of prior sample addition.

Figure 13:
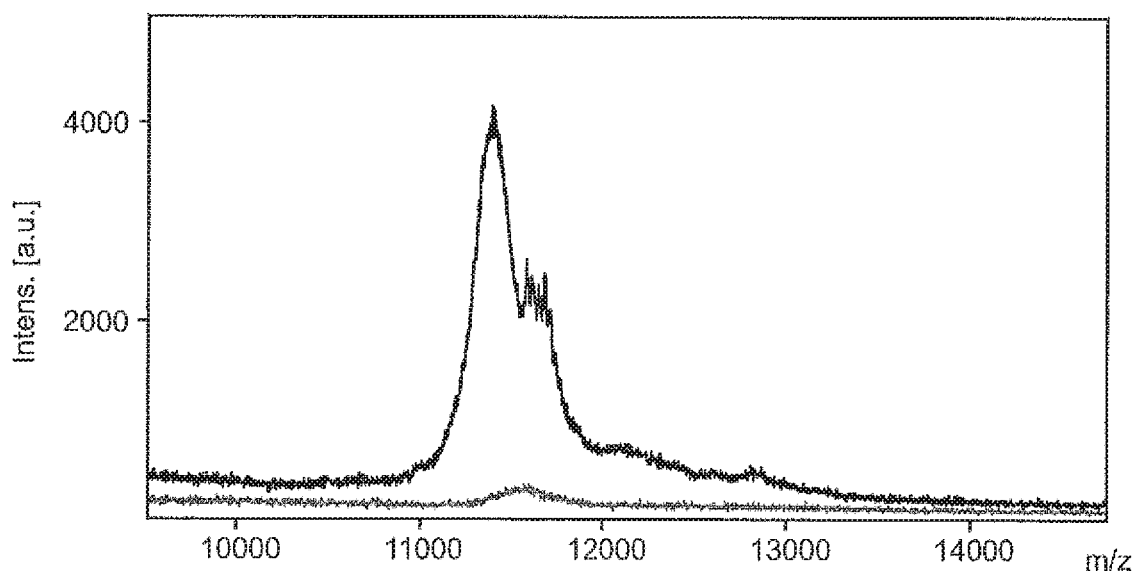

FIG. 13 shows the MALDI mass spectra of anti-free lambda conjugated sepharose (black line) and BMOE cross-linked anti-free lambda conjugated sepharose (grey line) eluted with 5% Acetic Acid containing 50 mM TCEP in the absence of prior sample addition.

Figure 14:
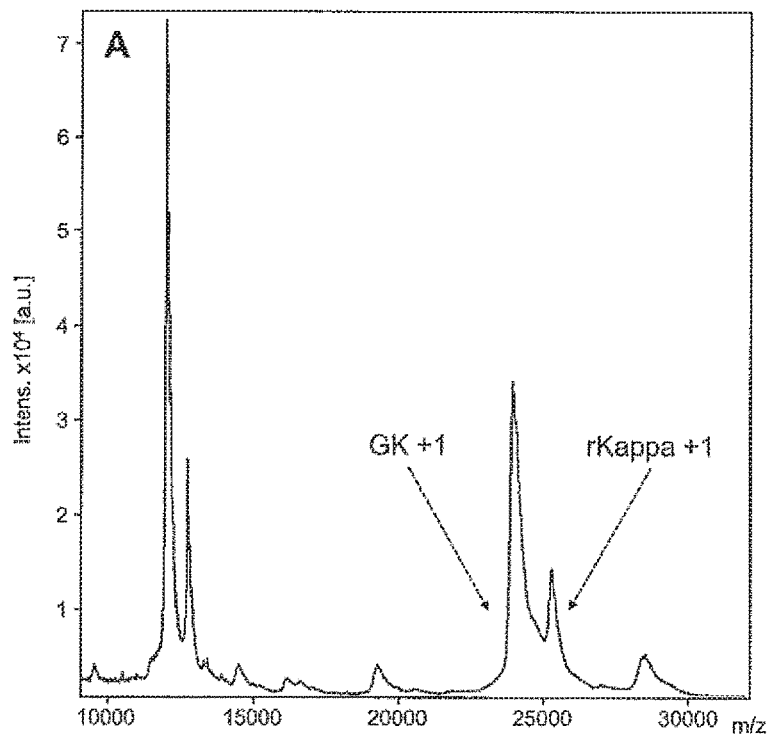

FIG. 14 shows a MALDI mass spectrum of recombinant kappa free light chain (rKappa) and endogenous IgG Kappa co-purified from human serum by Camelid anti-kappa conjugated sepharose (A). The coefficient of variation for the calculated peak areas of kappa light chain (GK), rKappa and GK/rKappa ratio are shown in (B).

INTRODUCTION OF THIOETHER BONDS INTO ANTIBODY F(AB')$_2$ FRAGMENTS BY ALKALINE TREATMENT

The conversion of antibody disulphide bonds to thioether bonds may be induced in alkaline environments at raised temperature. Formation of such bonds is generally known in the art, such as in Zhang et al IgG1 Thioether Bond formation in vivo. JBC, 288:16371-16382, 2013. Zhang and Flynn. Cysteine racemization IgG heavy and light chains, JBC, 288:34325-34335, 2013.

Figure 1:
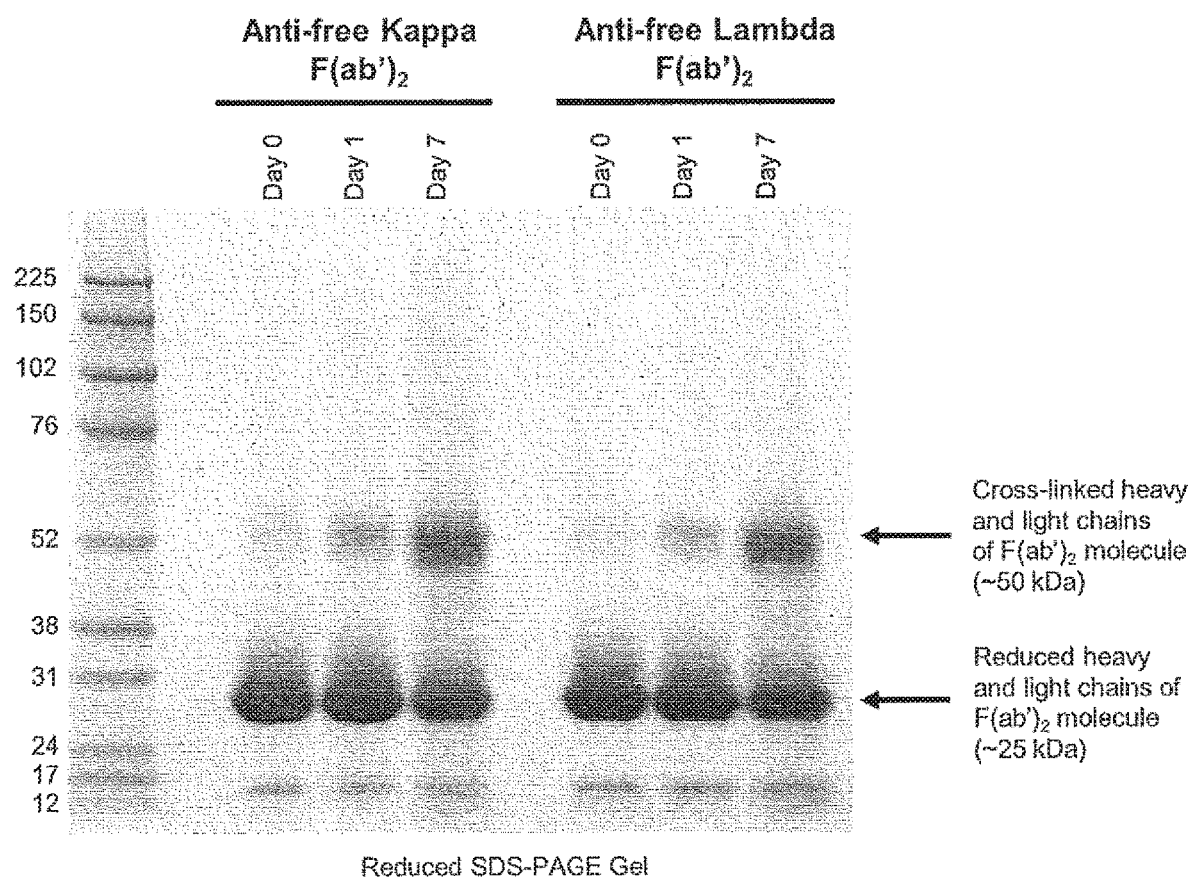
Figure 2:
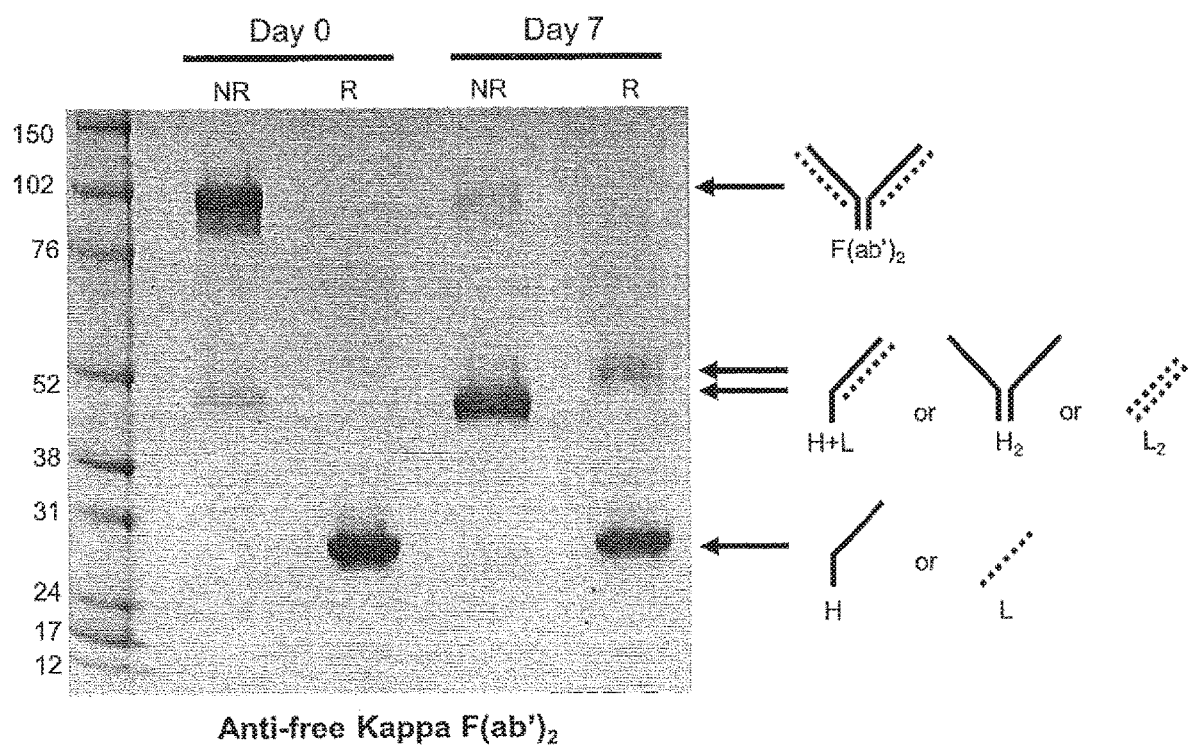
Figure 3:
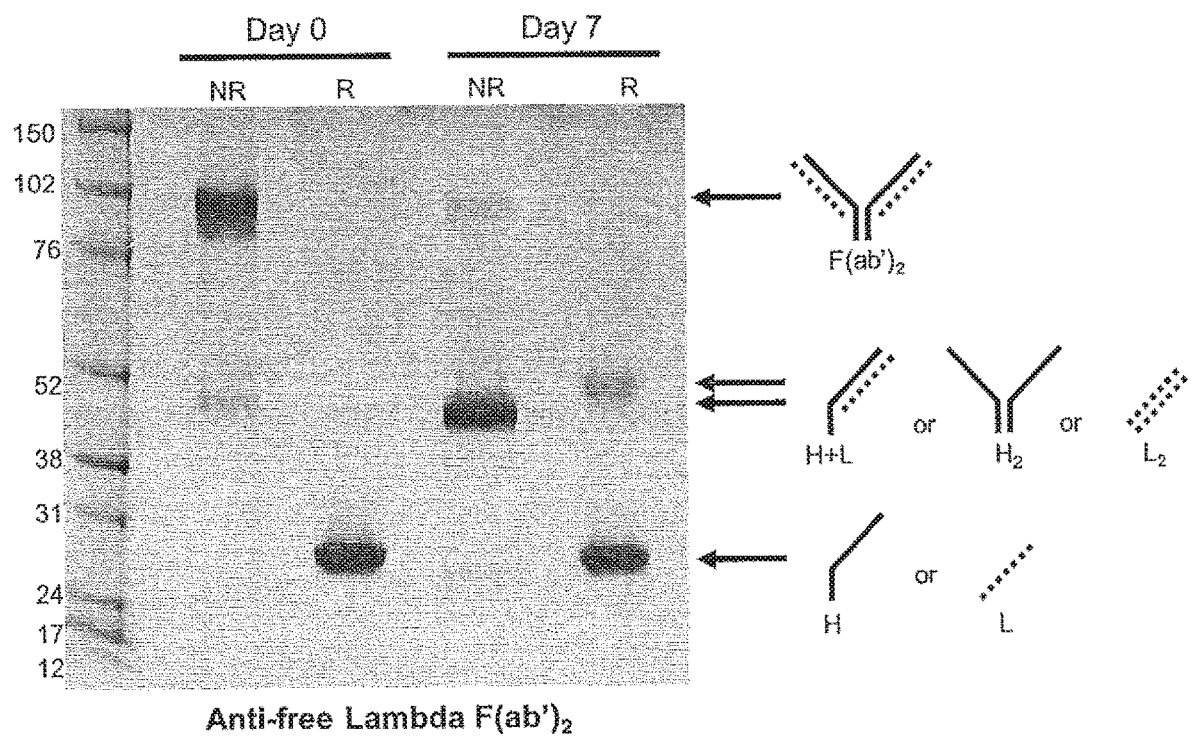

Commercially available Freelite™ F(ab')$_2$ antibodies were investigated to see whether alkaline-induced thioether bonds could be introduced into the fragments. These antibodies bind either free lambda or free kappa light chains. The data shown in FIGS. 1-4 shows that it is possible to introduce thioether cross-links into F(ab')$_2$ fragments by treatment with 50 mM Glycine-NaOH, pH 9 at 50° C. Approximately 20% cross-linking efficiency is observed compared to untreated F(ab')$_2$ after 7 days (FIGS. 1-3).

Figure 4:
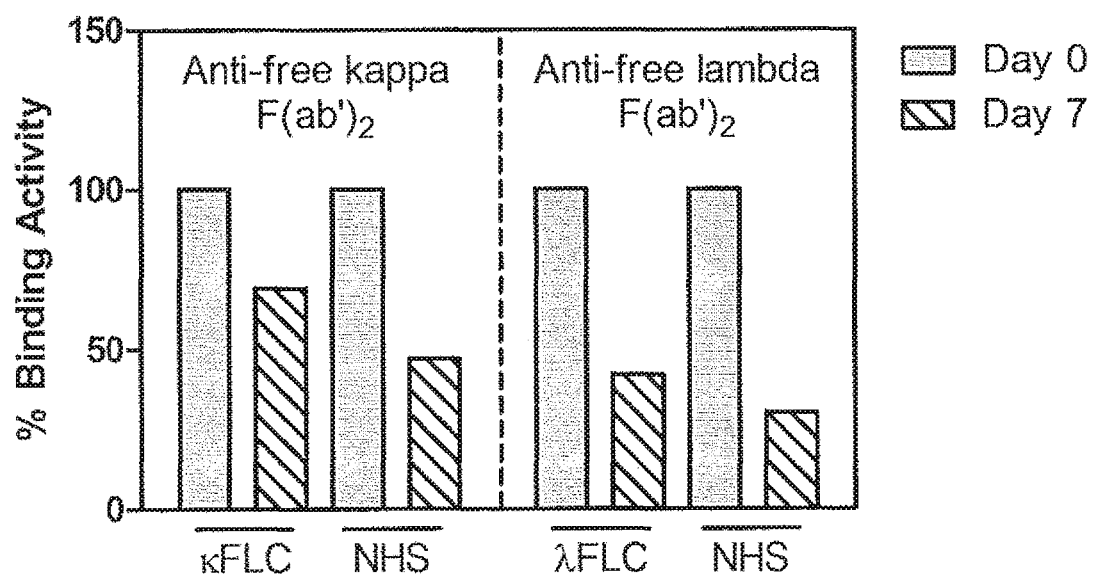
FIG. 4 shows the binding activity of thioether cross-linked and non-cross-linked anti-free kappa and anti-free lambda F(ab')$_2$ antibodies to free light chains (FLC) and normal human serum (NHS).

The binding activity of anti-free kappa and anti-free lambda antibodies was assessed by ELISA after 0 and 7 days alkaline treatment (FIG. 4). Antibodies were coated onto ELISA plates and presented with purified kappa light chains, purified lambda light chains or Normal Human Serum. Binding activity was detected by measuring absorbance at 450 nm using Tetramethylbenzidine (TMB) chromogenic substrate and anti-light chain antibodies conjugated to Horse Radish Peroxidase (HRP). Whilst there is some reduction in ELISA activity, as shown in FIG. 4, activity still remains in the treated antibodies.

Figure 5:
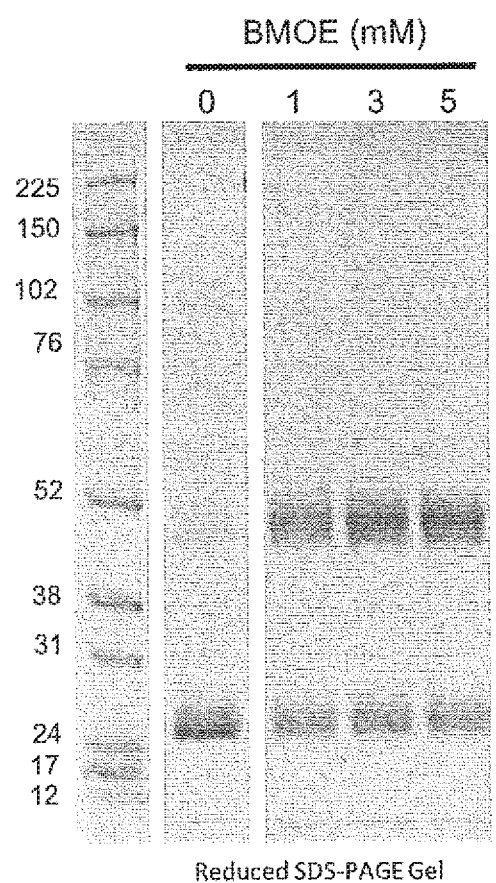
FIG. 5 shows the cross-linking of anti-lambda total F(ab')$_2$ antibodies by bismaleimidoethane (BMOE), as measured by reducing Coomassie Blue stained SDS-PAGE.

Bismaleimidoethane (BMOE) Cross-Linking of Anti-Lambda Total F(ab')$_2$ Fragments Anti-lambda F(ab')$_2$ antibodies were investigated to see if antibody chains could be cross-linked by BMOE. Anti-lambda F(ab')$_2$ fragments were reduced with 1 mM (TCEP). The TCEP was removed using Hi-Trap Desalting columns and the reduced anti-lambda total F(ab')$_2$ was cross-linked at 100-500× fold molar excess of BMOE and then analysed by Coomassie Blue stained SDS-PAGE run under reducing conditions. FIG. 5 shows that BMOE can cross-link F(ab')$_2$ fragments with an efficiency of over 50%. Moreover, the resulting antibody chain cross-links are resistant to reducing conditions.

Figure 6:
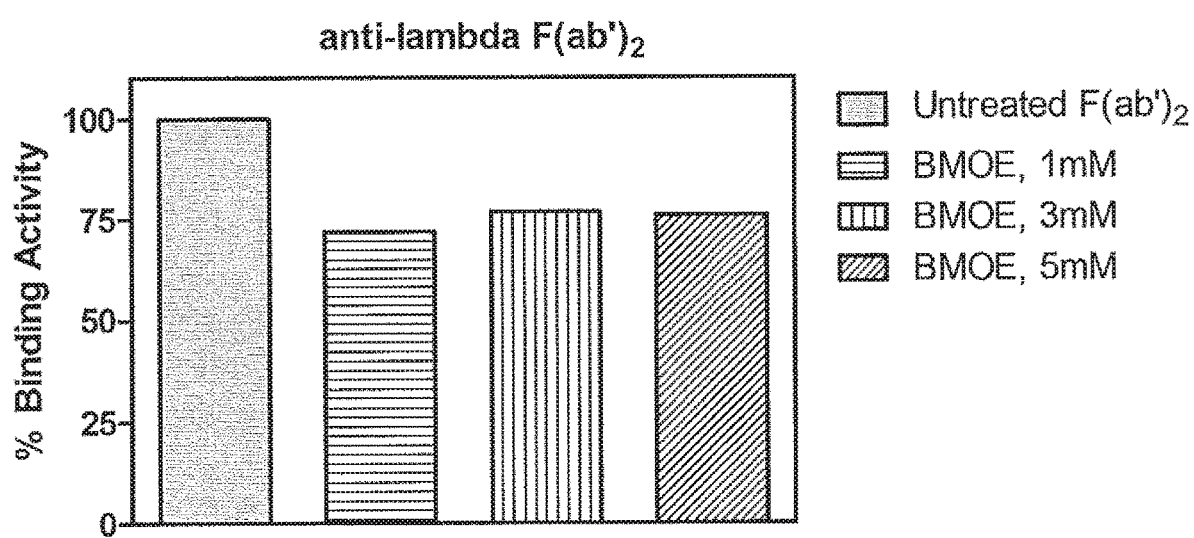
FIG. 6 shows the binding of anti-lambda total F(ab')$_2$ antibodies to IgG lambda before and after bismaleimidoethane (BMOE) cross-linking.

An ELISA plate was coated with polyclonal IgG Lambda and BMOE-treated or untreated anti-total lambda F(ab')$_2$ was bound to the plate. Binding activity by anti-total lambda was measured by light absorbance at 450 nm using anti-sheep-HRP and TMB substrate. Under conditions that produce >50% BMOE cross-linking (FIG. 5), anti-total lambda antibody retains over 70% IgG lambda binding activity (FIG. 6).

BMOE Cross-Linked Anti-Free Lambda and Anti-Free Kappa Antisera

Figure 7:
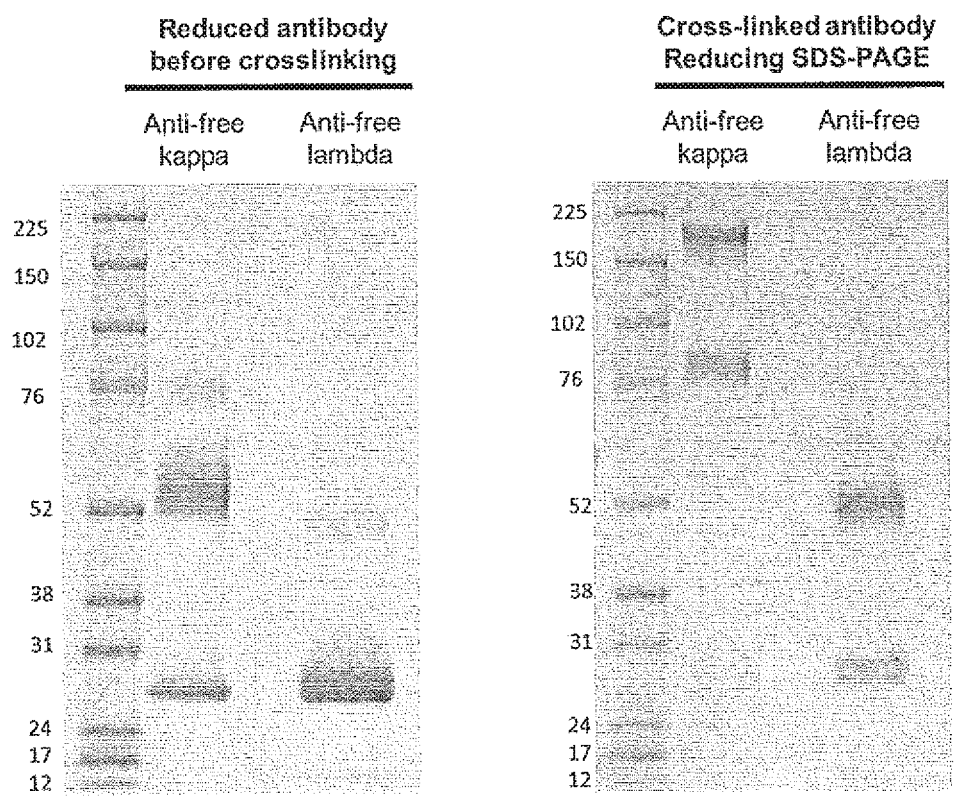
FIG. 7 shows anti-free lambda F(ab')$_2$ (10 µM) cross-linked with 2 mM bismaleimidoethane (BMOE) and anti-free kappa whole molecule (10 µM) cross-linked with 4 mM BMOE, as measured by reducing Coomassie Blue stained SDS-PAGE. Scanning densitometry of the reduced SDS-PAGE lanes indicated a cross-linking efficiency of >70% for anti-free lambda and >90% for anti-free kappa.

Commercially available Freelite™ antibodies were investigated to see whether antibody chains could be cross-linked by BMOE treatment. Whole molecule anti-free kappa and F(ab')$_2$ anti-free lambda were reduced with 1.5 mM and 1.0 mM TCEP, respectively. The TCEP was removed using Hi-Trap Desalting columns and the anti-free kappa and anti-free lambda antibodies were cross-linked at 400-fold and 200-fold molar excess of BMOE, respectively. Samples were analysed by Coomassie Blue stained SDS-PAGE run under reducing conditions. As shown in FIG. 7, the BMOE cross-linking efficiency is over 50% for antibodies in either F(ab')$_2$ or whole molecule formats.

Figure 8:
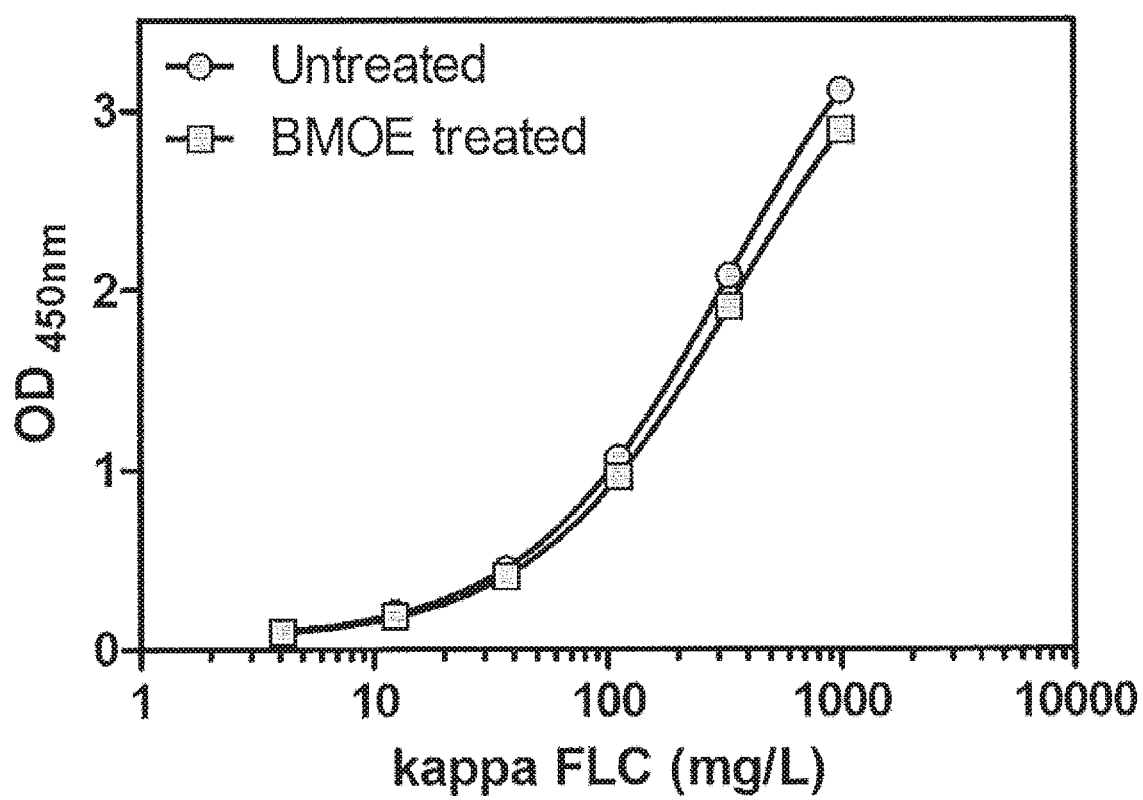
FIG. 8 shows untreated and bismaleimidoethane (BMOE) cross-linked anti-free kappa whole molecule binding to kappa free light chains. Cross-reactivity to IgG, IgA and IgM is also shown.
Figure 9:
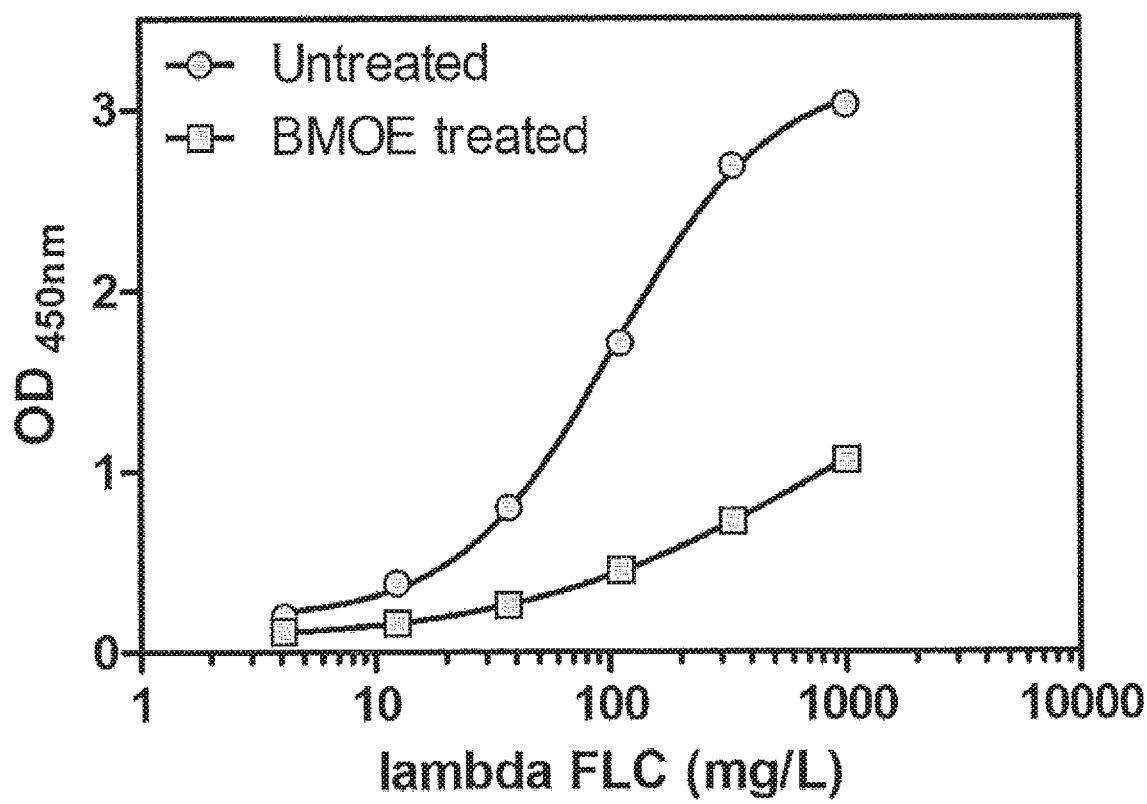
FIG. 9 shows untreated and bismaleimidoethane (BMOE) cross-linked anti-free lambda F(ab')$_2$ binding to lambda free light chains. Cross-reactivity to IgG, IgA and IgM is also shown.

Activity ELISA assays were performed whereby BMOE-treated and untreated antibodies were coated onto ELISA plates and presented with purified immunoglobulins (IgG, IgA, IgM, free kappa, free lambda). Binding activity was detected by measuring absorbance at 450 nm using anti-light chain-HRP and TMB substrate. The results in FIGS. 8-9 show that cross-linked antisera still maintain specific antigen binding activity.

Thioether Cross-Linking Stabilises Sepharose-Conjugated Anti-IgG3 Antibodies.

Untreated and thioether cross-linked (by alkaline treatment) anti-IgG3 antibodies were covalently conjugated to sepharose resin and in the absence of prior sample addition treated with 5% Acetic Acid containing 50 mM TCEP. Analysis of the eluted supernatant by MALDI-TOF MS (FIG. 10) showed that the thioether cross-linked antibody released less material than the untreated antibody, thereby demonstrating increased antibody stability. The anti-IgG3 binding activity is shown in FIG. 11 where each sepharose resin was incubated with human serum containing elevated IgG3 and eluted with 5% Acetic Acid containing 50 mM TCEP. Relative to the untreated antibody, MALDI-TOF MS analysis indicated a similar or greater binding activity by the thioether cross-linked anti-IgG3 antibody, as measured by peak area corresponding to human IgG lambda chain.

BMOE Cross-Linking Stabilises Anti-Free Kappa and Anti-Free Lambda Antibodies

Freelite™ anti-kappa and anti-lambda antibodies were either untreated or cross-linked with BMOE following reduction with TCEP and desalting on Hi-Trap Desalting columns. Antibodies were conjugated to sepharose resin, treated with 5% Acetic Acid containing 50 mM TCEP in the absence of prior sample addition and the supernatants were analysed by MALDI-TOF MS. As is shown in FIGS. 12-13, significantly fewer antibody fragments were released from the BMOE cross-linked antibodies, indicating a substantial increase in antibody stability.

The increased stability of the antibodies reduces cross-contamination of material from the purifying antibodies. This improves the accuracy of the further characterisation steps when used to purify and isolate samples of immunoglobulins from, for example, patients.

Control Analyte can be Distinguished from Subject Analyte by Mass Spectrometry

Human serum was supplemented with a recombinant kappa light chain of known quantity and known mass (control kappa chain). The endogenous and control kappa chains were co-purified from the serum using commercially available sepharose conjugated to Camelid anti-kappa antibody and the eluted supernatants were analysed by MALDI-TOF MS (FIG. 14). As shown in FIG. 14A, the control kappa chain is distinguishable from the endogenous kappa chain due to the difference in its relative molecular mass.

Control Analyte can be Used to Provide Quantitative Information about the Subject Analyte Endogenous kappa chains and control kappa chains were co-purified from human serum, spotted onto two 96-target plates and analysed by MALDI-TOF MS (FIG. 14B). Peak areas corresponding to each kappa chain were determined and used to calculate the coefficient of variation (% CV) across each plate and for 192 replicates encompassing both plates. FIG. 14B shows that when the peak area corresponding to endogenous kappa is expressed relative to the control kappa peak area in 192 replicates, the calculated % CV is less than 10%. This indicates a substantial diagnostic potential of the invention. The figure illustrates that an internal control analyte can be used to determine the abundance of a subject analyte relative to the control analyte, and thus, can provide quantitative as well as qualitative information about the subject analyte. This observation also demonstrates that a control analyte may be used to verify the success of a purification procedure, and serves to minimise errors in data collection caused by, for example, differential ionisation of MALDI targets spots.

The invention claimed is:

1. A composition comprising a population of polyclonal anti-immunoglobulin specific antibodies or anti-immunoglobulin specific fragments thereof, wherein at least 70% of the antibodies or fragments thereof of the population comprise one or more non-reducible thioether containing cross-links between at least one heavy chain or fragment thereof and at least one light chain or fragment thereof of the antibodies or fragments thereof;
  wherein said one or more non-reducible thioether containing cross-links replace one or more naturally occurring disulphide bonds between said at least one heavy chain or fragment thereof, and said at least one light chain or fragment thereof; and
  further, wherein said non-reducible thioether containing cross-links are introduced by a reagent comprising a bis-maleimide cross-linker.

2. The composition according to claim 1, wherein the polyclonal anti-immunoglobulin antibodies or anti-immunoglobulin specific fragments thereof are anti-free light chain specific, anti-heavy chain class specific, anti-heavy chain subclass specific, anti-heavy chain class-light chain type specific, or anti-light chain type specific.

3. The composition according to claim 1, attached to a support.

4. The composition according to claim 1, comprising polyclonal anti-immunoglobulin specific F(ab')$_2$ fragments.

5. The composition of claim 1, wherein the bis-maleimide cross-linker is bis-maleimidoethane (BMOE).

6. The composition of claim 4, wherein the polyclonal anti-immunoglobulin specific F(ab')$_2$ fragments are selected from the group consisting of: anti-free kappa F(ab')$_2$ fragments, anti-free lambda F(ab')$_2$ fragments, and anti-total lambda F(ab')$_2$ fragments.

7. An immunoglobulin purification and assay kit for use in mass spectrometry, comprising the composition of claim 1 and one or more mass spectrometry standards.

8. An assay kit, comprising: the composition of claim 1 and an immunoglobulin or fragment thereof mass spectrometry standard.

9. The assay kit according to claim 8 comprising a mass spectrometry target.

10. A method of preparing a sample for analyzing by mass spectrometry comprising:
  (i) providing a sample from a subject, the sample comprising immunoglobulins or fragments thereof;
  (ii) adding to the sample a predetermined amount of a control immunoglobulin or fragment thereof having a predetermined molecular weight;
  (iii) copurifying the control immunoglobulin or fragment thereof with the immunoglobulin or fragment thereof by immunopurification using the composition of claim 1.

11. The method according to claim 10, wherein the control immunoglobulin or fragment thereof has a higher or lower molecular weight than an immunoglobulin or fragment thereof of interest to be measured by the mass spectrometry.

12. The method according to claim 10, additionally comprising the step of subjecting a target comprising the copurified sample to mass spectrometry to analyze the sample.

13. A reagent for detecting a target immunoglobulin analyte in a biological sample by mass spectrometry, comprising:
  a population of polyclonal anti-immunoglobulin specific monomeric antibodies or anti-immunoglobulin specific fragments thereof wherein at least 70% of the antibodies or fragments thereof of the population comprise one or more non-reducible thioether containing cross-links between at least one heavy chain or fragment thereof and at least one light chain or fragment thereof of the polyclonal anti-immunoglobulin specific monomeric antibodies or anti-immunoglobulin specific fragments thereof;
  wherein said one or more non-reducible thioether containing cross-links replace one or more naturally occurring disulphide bonds between said at least one heavy chain or fragment thereof, and said at least one light chain or fragment thereof; and
  further, wherein the non-reducible thioether containing cross-links are introduced by a reagent comprising a bis-maleimide cross-linker.

14. The reagent of claim 13, wherein the population of polyclonal antibodies consists of anti-immunoglobulin G (IgG) antibodies.

15. The reagent of claim 14, wherein the population of polyclonal antibodies consists of anti-IgG3 antibodies.

16. The reagent of claim 13, wherein the polyclonal anti-immunoglobulin specific monomeric antibodies or anti-immunoglobulin specific fragments thereof are selected from the group consisting of: anti-free kappa light chain antibodies or F(ab')2 fragments thereof, anti-free lambda chain antibodies or F(ab')2 fragments thereof, and anti-lambda total antibodies or F(ab')2 fragments thereof.

17. The reagent of claim 13, wherein the bis-maleimide cross-linker is bis-maleimidoethane (BMOE).

18. A method of purifying or characterizing an immunoglobulin, comprising:
  contacting a sample containing the immunoglobulin with a composition comprising a population of polyclonal anti-immunoglobulin specific antibodies or anti-immunoglobulin specific fragments thereof, wherein:
    at least 70% of the polyclonal anti-immunoglobulin specific antibodies or immunoglobulin specific fragments thereof of the population comprise one or more non-reducible thioether containing cross-links between at least one heavy chain or fragment thereof and at least one light chain or fragment thereof of the polyclonal anti-immunoglobulin specific antibodies or immunoglobulin specific fragments thereof;
    said one or more non-reducible thioether containing cross-links replace one or more naturally occurring disulphide bonds between said at least one heavy chain or fragment thereof and said at least one light chain or fragment thereof; and
    said non-reducible thioether containing cross-links are introduced by a reagent comprising a bis-maleimide cross-linker;
  allowing immunoglobulin to bind to the antibodies or fragments thereof,
  washing unbound material away from the immunoglobulin bound to the antibodies or fragments thereof; and
  removing the bound immunoglobulin from the antibodies or fragments thereof to produce purified immunoglobulin or immunoglobulin fragment.

19. The method according to claim 18, further comprising characterizing the purified immunoglobulin by mass-spectroscopy.

* * * * *